July 16, 1963

R. E. GARCIA 3,097,627

AUTOMATIC TIME OPERATED FEEDING MEANS FOR SUCCESSIVELY
FEEDING ANIMALS IN A PLURALITY OF STALLS

Filed Oct. 23, 1961

INVENTOR.
Robert E. Garcia
BY
Webster & Webster
ATTYS.

July 16, 1963

R. E. GARCIA 3,097,627

AUTOMATIC TIME OPERATED FEEDING MEANS FOR SUCCESSIVELY
FEEDING ANIMALS IN A PLURALITY OF STALLS

Filed Oct. 23, 1961

R. E. GARCIA 3,097,627

AUTOMATIC TIME OPERATED FEEDING MEANS FOR SUCCESSIVELY
FEEDING ANIMALS IN A PLURALITY OF STALLS

Filed Oct. 23, 1961

United States Patent Office 3,097,627
Patented July 16, 1963

3,097,627
AUTOMATIC TIME OPERATED FEEDING MEANS
FOR SUCCESSIVELY FEEDING ANIMALS IN A
PLURALITY OF STALLS
Robert E. Garcia, Rte. 1, Box 1140, Escalon, Calif.
Filed Oct. 23, 1961, Ser. No. 146,751
7 Claims. (Cl. 119—51.11)

The present invention is directed to, and it is a major object to provide, a novel feeding device for animals; such device being especially adapted for—but not limited to—the feeding of calves.

Another important object of the invention is to provide a device for nipple-feeding of fresh milk to individual calves in separate stalls; the stalls being arranged in a row, and the device being operative to intermittently and successively progress from stall to stall whereby, during the period of time that the device stands stationary thereat, the calf in each stall has an opportunity to feed from a then adjacent and accessible milk-feeding nipple.

Still another object of the invention is to provide a calf-feeding device, as in the preceding paragraph, which includes a circular track, and a power driven carriage which runs on such track; the stalls being disposed in a circular row concentric to and adjacent but outwardly of such track, and there being a radial boom extending from a pivotal mount at the center of the track to the carriage to maintain and guide the latter on said track.

An additional object of the invention is to provide a calf-feeding device, as above, wherein the carriage supports the entire feeding apparatus, including a fresh milk tank, the milk-feeding nipple, and a valve controlled conduit system connected between such tank and the nipple; the conduit system having means interposed therein to warm the milk and to regulate the amount thereof made available to each calf as the device progresses from stall to stall.

It is also an object of the invention to provide a practical and reliable animal-feeding device, and one which will be exceedingly effective for the purpose for which it is designed.

These objects are accomplished by means of such structure and relative arrangement of parts as will fully appear by a perusal of the following specification and claims.

In the drawings:

FIG. 3 is an enlarged outer end elevation of the device, partly broken away and partly in section.

Figure 1:
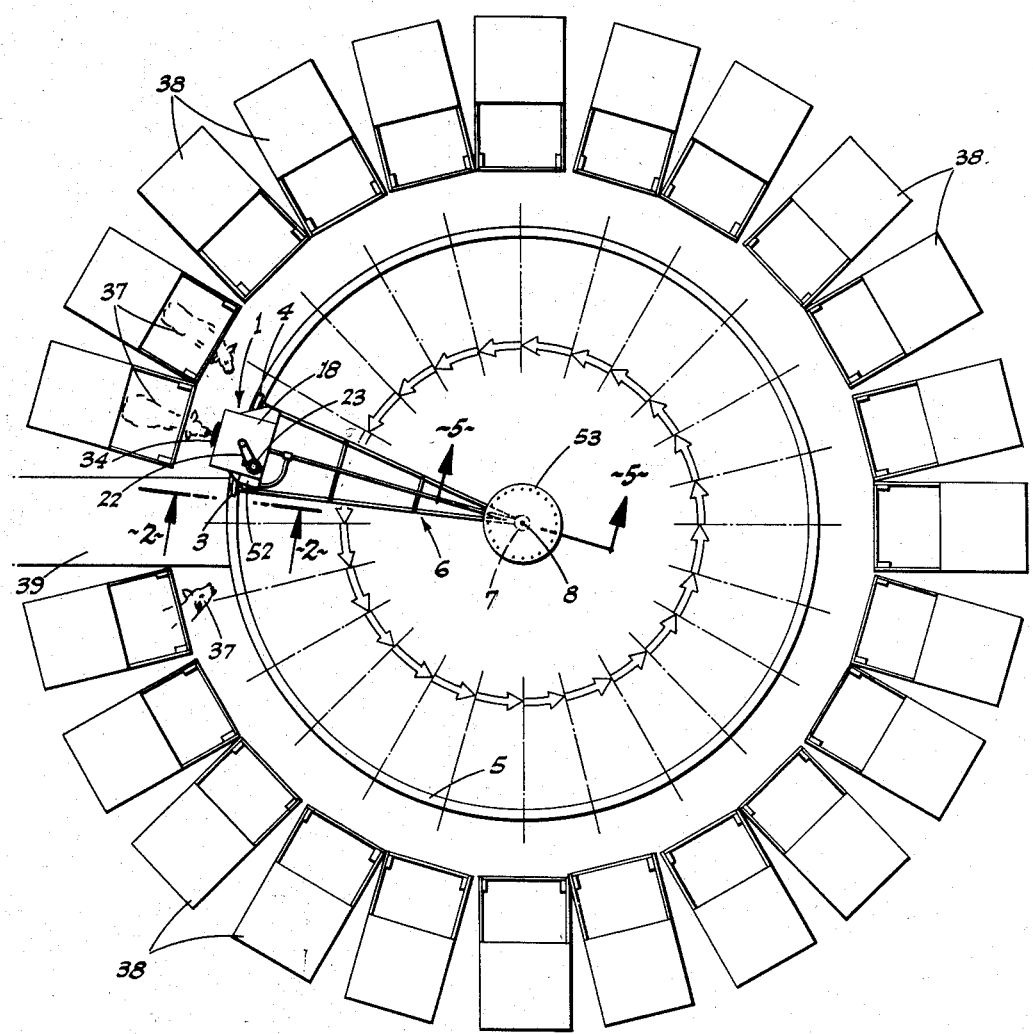
FIG. 1 is a plan view of the device as in use; the view being somewhat diagrammatic.

For the purpose of clarity a majority of the circuit wiring is omitted from FIGS. 1-7 inclusive.

Referring now more particularly to the drawings and to the characters of reference marked thereon, the device comprises a carriage, indicated generally at 1, and which includes an open, upstanding frame 2 having a front wheel 3 and a rear wheel 4 journaled thereon.

The wheels 3 and 4 ride on a circular track 5 of substantial diameter, such track preferably being of concrete.

A radial multi-leg boom, indicated generally at 6, extends from a central hub 7 to a fixed connection with the frame 2; such hub 7 being journaled on a fixed, upstanding, central post 8 mounted on a concrete base or pedestal 9 at the center of the track 5.

The boom 6 serves to maintain the carriage 1 on the track 5, and for guided travel thereon, as will hereafter appear; the carriage being driven by the following mechanism:

The frame 2 is provided, at the bottom, with a floor 10, and an electric motor 11 is secured on such floor; such electric motor 11 driving a reduction gear box 12 by means of an endless belt and pulley unit 13. In turn, the reduction gear box 12 drives the front wheel 3 by means of an endless chain and sprocket unit 14.

With this arrangement, operation of the electric motor 11 causes the carriage 1 to travel along the track 5 in a counter-clockwise direction; such travel being intermittent, as will hereinafter appear.

An insulated milk supply tank 15 is mounted on the carriage 1 and such tank is supported, in the main, by a platform 16 included in the frame 2 some distance above the floor 10. The milk supply tank 15, in addition to being insulated, is also preferably refrigerated; the refrigerating mechanism being omitted, except for a disclosure of the refrigeration coils 17.

The milk supply tank 15 includes a removable cover 18 to permit a relatively large quantity of fresh milk 19 to be delivered into such tank. A vertical shaft 20 is journaled in connection with the cover 18 centrally thereof and thence depends into the tank 15; there being an agitator blade or propeller 21 fixed on the lower end of such shaft. At its upper end the shaft 20 projects above the cover 18 and is there driven by an endless belt and pulley unit 22 from an electric motor 23 mounted on such cover.

A milk-feeding nipple 24 is disposed in a radially outwardly projecting position beyond the outer end of the carriage 1; such nipple 24 being replaceably carried in a fitting 25 removably engaged in a collar 26 and normally maintained in the latter by a hand set screw 27.

The collar 26 is fixed in connection with, and supported by, an arm 28 which extends at an upward and inward slope to connection with the tank supporting platform 16 centrally between the front and rear of the carriage. The connection between the supporting arm 28 and the carriage comprises a horizontal transverse sleeve 29 fixed on the inner end of arm 28 and turnably carried on a stub shaft 30 secured to a bracket 31 that depends from the platform 16. The stub shaft 30 projects somewhat beyond the free end of the sleeve 29, and a torque spring 32 surrounds the projecting portion of the shaft. This spring, connected between the shaft 30 and sleeve 29, tends to rotate the latter in a direction to swing the supporting arm 28 downward to a stop position, as in FIG. 6, and at which time a stop 33 on the sleeve abuts the top flange of bracket 31 from below. This arrangement limits the extent to which the supporting arm 28, and consequently the nipple 24, can lower, but permits both to yield upwardly against the torque of spring 32.

A circular, radially outwardly facing baffle disc 34, preferably of rubber, is mounted on the collar 26 in surrounding relation to the inner end of the nipple 24; there being an inverted U-shaped nose engaging yoke 35 disposed symmetrically above the nipple 24 intermediate its ends. Such yoke 35 is carried on the outer end of a rigid finger 36 whose inner end is rigidly attached to the supporting arm 28.

As so mounted the milk feeding nipple 24 projects radially outwardly from the carriage 1 to a point for ready access by a calf 37 in any one of a multiplicity of pens or stalls 38 arranged in a circular row adjacent but spaced outwardly from the track 5. Such rows of stalls 38 is full-circle, except that one stall is omitted to provide a walkway 39 on which an attendant gains access to the device when it is alined with such walkway, and which access is necessary for servicing, including the filling of fresh milk into the tank 15. Such tank is provided, at the bottom, with a depending outlet pipe 40 having a normally closed, solenoid-actuated, valve 41 therein.

Figure 8:
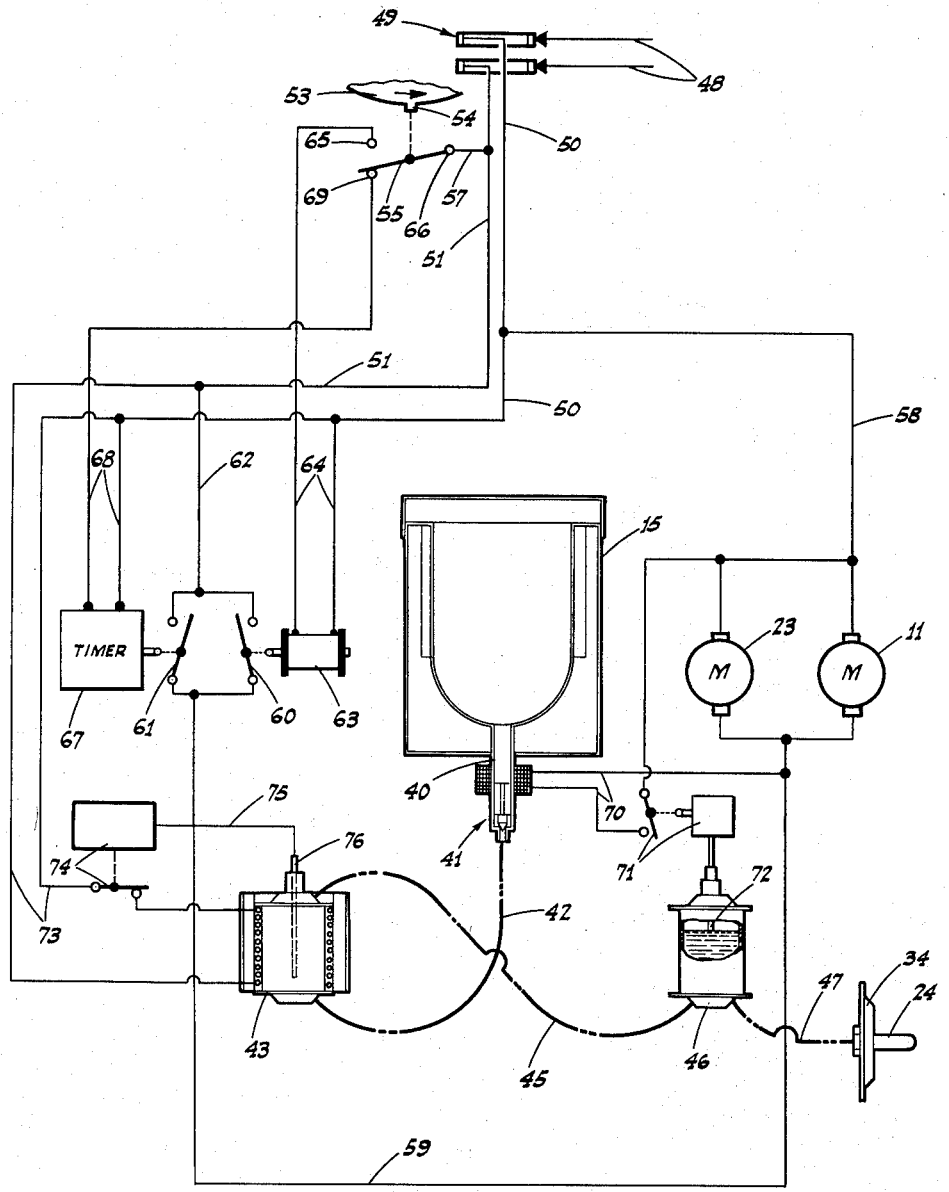
FIG. 8 is a mainly diagrammatic illustration of one form of circuit that may be employed to control the automatic operation of the device.

As diagrammatically illustrated in FIG. 8, a hose 42 leads from the bottom of the outlet pipe 40 to connection with the bottom of a milk warming receptacle 43 mounted between the carriage floor 10 and the tank supporting platform 16. Such milk warming receptacle 43 is electrically heated; the resistance heating coil being indicated at 44.

Another hose 45 connects between the top of the milk warming receptacle 43 and the bottom of a milk delivery receptacle 46 suspended from the platform 16.

A third hose 47 is separately connected to the bottom of the milk delivery receptacle 46 and leads to coupling with the fitting 25, whereby to deliver milk to the nipple 24.

The milk warming receptacle 43 has a greater capacity than that of the milk delivery receptacle 46, whereby upon opening of the normally closed solenoid-actuating valve 41 the quantity of milk required to fill the milk delivery receptacle 46 will be pre-warmed in the receptacle 43. The milk delivery receptacle 46 is designed to hold the quantity of milk that it is desired to feed each calf at a given time; i.e., during the feeding period that the carriage 1 stands stationary in front of each stall 38.

Operating under the control of the mechanism and circuitry later described, the calf-feeding device functions in the following manner:

After the calf in one stall 38 has completed feeding, and at the end of a predetermined or timed feeding period at which the carriage 1 stands stationary in alinement with such stall, the electric motor 11 is placed in operation, and which in turn drives the carriage 1 forwardly or counter-clockwise on the track 5.

During the time that the carriage 1 is moving from one stall to the next, the solenoid-actuated valve 41 is opened so that milk flows from tank 15 to the milk warming receptacle 43 and from the latter to the milk delivery receptacle 46; such solenoid-actuated valve 41 being automatically closed when said milk delivery receptacle 46 is filled to a predetermined level.

Figure 2:
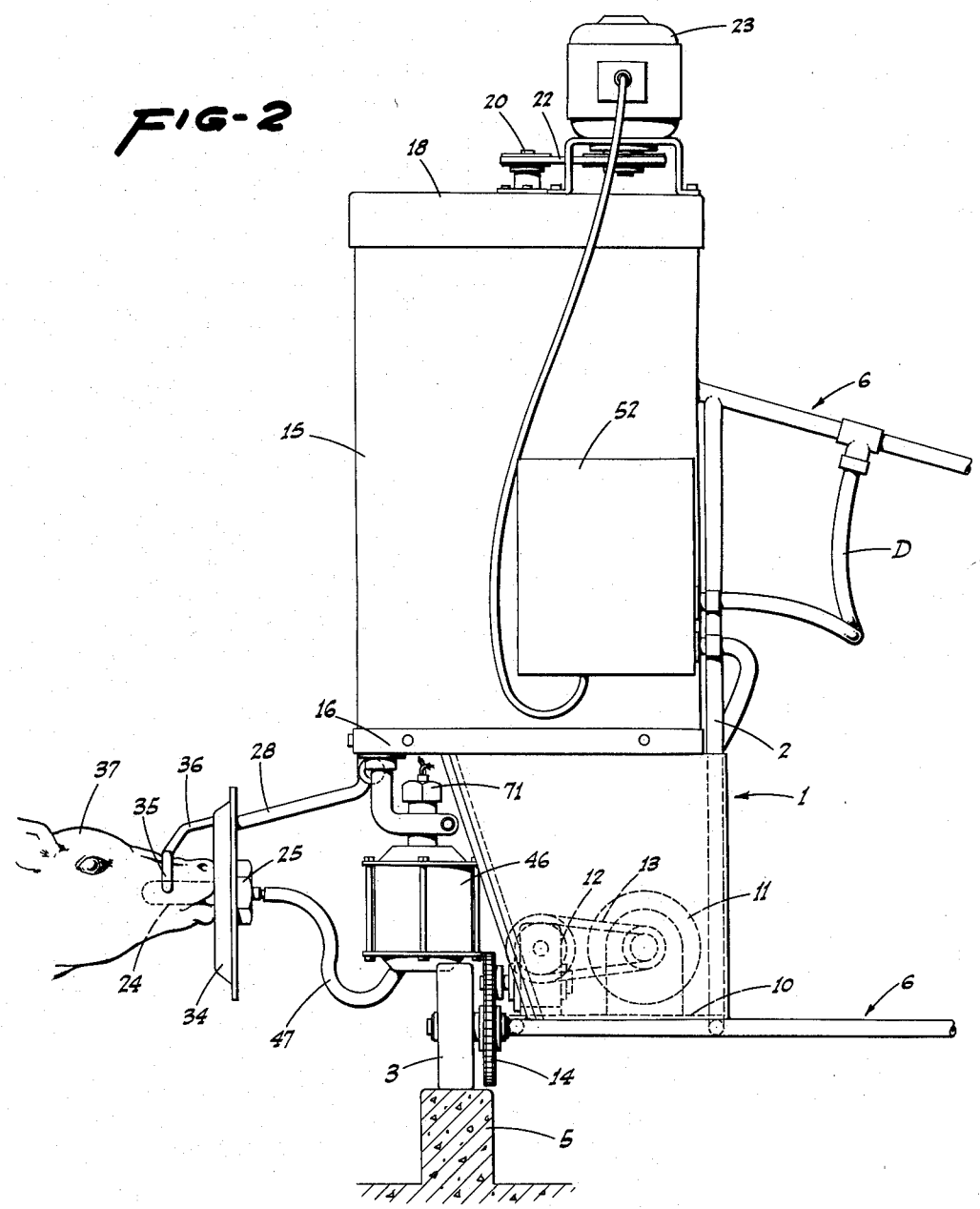
FIG. 2 is an enlarged fragmentary front or forward side elevation of the device; the view being taken substantially on line 2—2 of FIG. 1.

With the milk delivery receptacle 46 so filled and when the carriage reaches a position alined with said next stall, the electric motor 11 is deenergized and said carriage stops for a predetermined or timed feeding period. The calf 37 in such next stall then takes the nipple 24 in its mouth and feeds from such nipple in a normal manner. The baffle disc 34 simulates the udder of a cow; the calf abutting its nose against such disc during feeding from the nipple as indicated in FIG. 2.

Also, as the calf feeds it tends to recurringly lift its head, which moves the nipple upwardly and which motion is permitted by the upwardly yieldable supporting arm 28. However, with the inverted U-shaped yoke 35 engaging over or straddling the nose of the calf while it feeds from the nipple 24, such yoke prevents the calf from bending the nipple upwardly to an extent that might cause rupturing thereof.

Each predetermined or timed feeding period is of sufficient duration for the calf to consume all of the milk from the receptacle 46.

In order to assure against any separation of milk and cream in the tank 15, the agitator propeller or blade 21 is provided on the lower end of the vertical shaft 20; such shaft being driven from the motor 23 each time that the carriage 1 progresses from one stall to the next.

Figure 5:
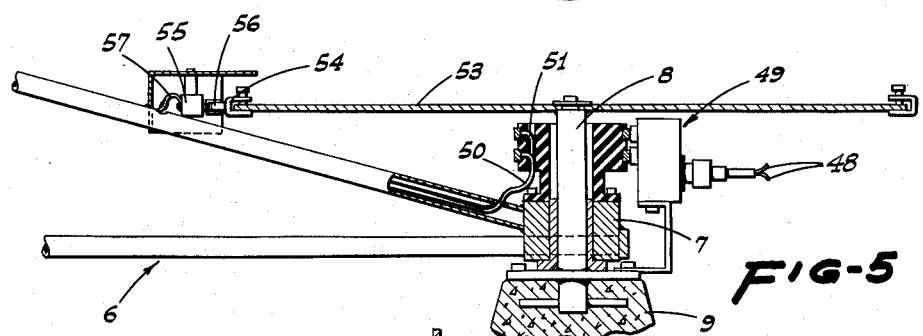
FIG. 5 is an enlarged fragmentary elevation, mainly in section, of the structure shown in FIG. 4; the view being taken substantially on line 5—5 of FIG. 1.
Figure 6:
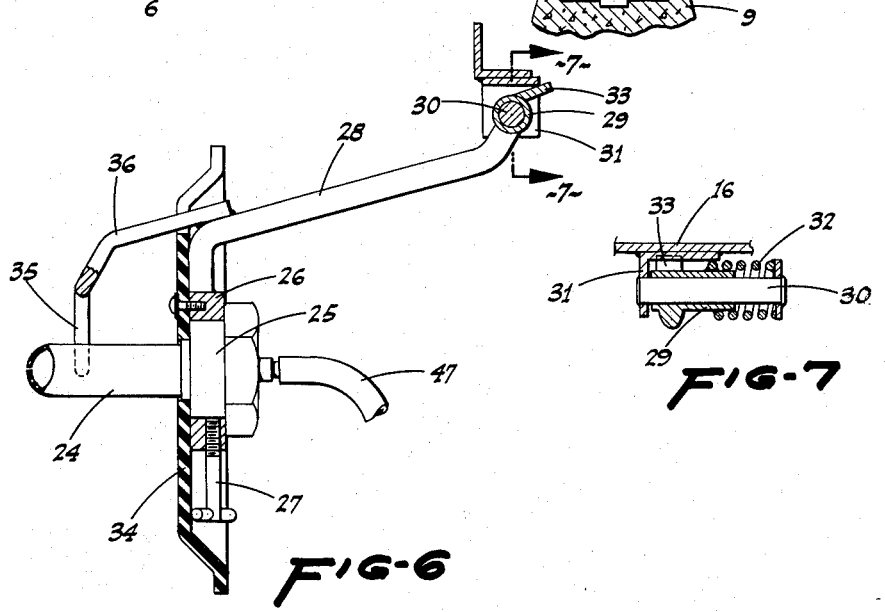
FIG. 6 is an enlarged side elevation of the milk feeding nipple and its mount; the view being partly in section.
Figure 7:
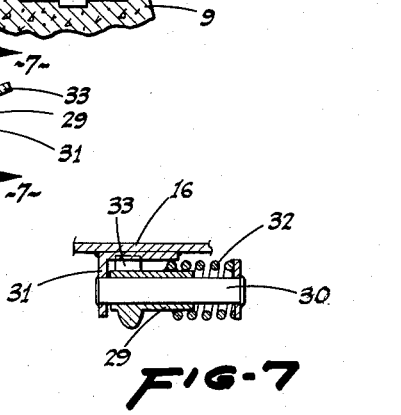
FIG. 7 is a fragmentary sectional elevation on substantially line 7—7 of FIG. 6.

The mechanism and circuitry employed in the automatic control of the above described device is illustrated particularly in FIG. 8 and comprises the following:

Electric current from an outside source is supplied by wires 48 which lead to a slip ring unit 49 surrounding the post 8, one part of the unit being fixed in connection with the post and the other with the central hub 7 (see FIG. 5). From the slip ring unit 49 electric current feed wires 50 and 51 enter one leg of the boom 6 and extend therein to adjacent the tank 15, whence such wires are carried in a duct D into a box 52 mounted on one side of said tank 15; the box 52 containing much of the switching and timing apparatus hereinafter described.

A stationary, horizontal, indexing disc 53 is fixed centrally on the upper end of the post 8; the disc being of substantial diameter and on one side overhanging the boom 6. At circumferentially spaced points about the periphery thereof, and which points correspond to the positions of the stalls 38, the disc 53 is fitted with indexing tabs 54 which project a short distance radially out from such periphery.

A two-way switch 55 is mounted on one leg of the boom 6 in a position such that the switch operating roller 56 successively rides onto the tabs 54 with travel of the carriage 1 on the track 5. Each time that the roller 56 rides onto one of the tabs 54 the two-way switch 55 is opened on one side and closed on the other. The wires to which the switch 55 is connected lead through one leg of boom 6 and duct D into the box 52; one such wire being indicated at 57 in FIGS. 5 and 8.

The control circuit, which includes the feed wires 50 and 51, and the switch 55, is shown—by way of example— in FIG. 8, wherein:

The motors 11 and 23 are connected in parallel, as shown, and a wire 58 leads from wire 50 to one side of such motors; there being another wire 59 leading from the other side thereof to one side of a pair of switches 60 and 61 likewise connected in parallel. A wire 62 leads from the other side of said switches 60 and 61 to the wire 51. The above comprises the primary or motor control circuit.

The switch 60 includes a solenoid 63 and when the latter is energized such switch 60 is closed; the circuit for such solenoid being indicated at 64, with one lead thereof extending to wire 50 and the other lead to one side or terminal 65 of two-way switch 55. The common terminal 66 of switch 55 is connected by the wire 57 to wire 51.

The switch 61 is operated by an electric timer 67 whose energizing circuit is indicated at 68; one lead of such circuit 68 extending to wire 50 and the other lead to the other or remaining side or terminal 69 of switch 55. The timer 67 is operative when energized, and after a predetermined time delay of several minutes, to close switch 61.

It will be recognized that with either switch 60 or 61 closed, the primary circuit of wires 50, 58, 59, 62, and 51 is likewise closed, which results in operation of motors 11 and 23.

Figure 4:
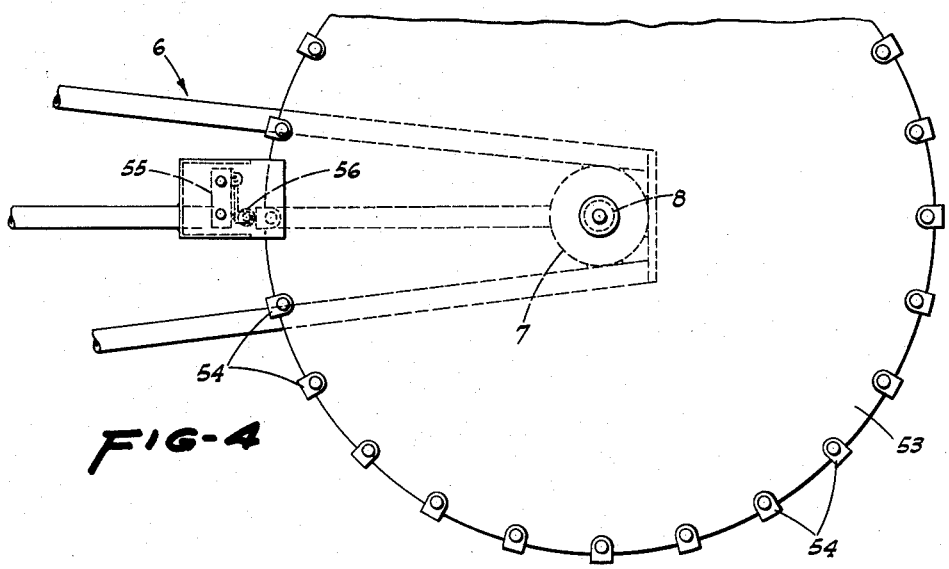
FIG. 4 is an enlarged fragmentary plan view showing the indexing disc, the adjacent portion of the boom, and the associated switch.

Assuming that the carriage 1 has just moved to a position in alinement with one of the stalls 38, the corresponding tab 54 on indexing disc 53 is then engaged by the switch arm roller 56 and the switch 55 is opened from terminal 65 and closed with terminal 69 as indicated in FIGS. 4 and 8.

When switch 55 is thus opened from terminal 65, the circuit 64 as well as solenoid 63, are deenergized and switch 60 opens. This breaks the primary circuit and motor 11 is deenergized, so that the carriage 1 stops in the aforesaid alined position with a stall, remaining stationary in such position for a predetermined length of time and during which the calf in such stall feeds from the nipple 24.

The closing of switch 55 with terminal 69 energizes circuit 68 and the timer 67, the latter—after such length of time during which the calf feeds—acting to close the previously open switch 61. Upon such closing of switch 61, the primary circuit is closed and motor 11 energized; the motor then initiating forward movement of the carriage 1 toward the next stall.

Upon such initial forward movement of the carriage, the switch arm roller 56 escapes the related tab 54 and switch 55 reverses, i.e. opens from terminal 69 and closes with terminal 65. This breaks circuit 68, deenergizes the timer 67, and switch 61 opens, but the primary circuit and motor 11 are not deenergized. This is for the reason that the primary circuit is then maintained closed as a result of switch 55 closing with terminal 65, and the resultant energization of circuit 64 and solenoid 63 which in turn closes switch 60.

With switch 60 thus closed, the motor 11 continues to advance the carriage until it alines with the next stall, whereupon the switch arm roller 56 rides onto the adjacent or related tab 54, and the carriage stops for a feeding period—all in the manner previously described.

During the interval that the carriage 1 is moving forward from one stall to another, the milk delivery receptacle is refilled with warm milk from the receptacle 43 and which is accomplished as follows:

The normally closed solenoid actuated valve 41 is provided with an energizing circuit 70 connected to the wires 58 and 59 of the primary circuit in parallel to the motors 11 and 23. Thus, when the primary circuit is closed and the carriage is moving forward, the valve 41 is energized and open; milk then flowing from the tank through hose 42, milk warming receptacle 43, and hose 45 into the milk delivery receptacle 46. Upon the latter being filled with a given amount of milk, and which occurs before the carriage reaches its next stop position, the circuit 70 is broken by opening of a switch 71 interposed in such circuit 70; the switch 71 being of liquid level responsive type, including a probe 72 which depends into receptacle 46.

Also, during advance of the carriage from stall to stall, the milk in tank 15 is stirred or agitated by reason of the fact that motor 23—driving shaft 20 and blade 21—runs simultaneously with motor 11.

The resistance heating coil 44 for the milk warming receptacle 43 is energized by a circuit 73 connected to the feed wires 50 and 51. In order to prevent overheating of the milk the circuit 73 has a thermostatic switch 74 interposed therein, and which includes a tube 75 leading to a probe 76 extending into said receptacle 43.

As will be clearly evident from the showing in FIG. 4, the switch opening tabs 54 are removable from the supporting member 53. This enables the carriage to continue moving past any stall without being halted, in the event that such stall should be empty at the time. In this way, no time is lost or wasted in carrying out a complete feeding operation.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. In an animal feeding device which includes a carriage mounted for movement past a row of individual animal stalls and having feeding means thereon, means to move the carriage including an electric motor, and automatically functioning means arranged to cause intermittent operation of the motor so that the carriage will be moved from stall to stall in succession and will be halted for a predetermined period at each stall.

2. In an animal feeding device which includes a carriage mounted for movement past a row of individual animal stalls and having feeding means thereon, means to move the carriage including an electric motor, a circuit for the motor, a normally closed switch in the circuit, and automatically functioning switch control means arranged to cause said switch to remain closed while the carriage is moving from one stall to the next, to be then opened and held open for a predetermined time, and to be then again closed.

3. A structure, as in claim 2, in which the switch control means comprises an indexing member fixed relative to the carriage and having a peripheral edge parallel to the path of movement of the carriage, the switch being mounted on the carriage and having an element projecting therefrom toward said edge and which when depressed opens the switch, and a plurality of tabs secured in spaced relation on said member and projecting from said edge thereof in position for successive engagement with and depression of said switch element.

4. In an animal feeding device which includes a carriage mounted for movement past a row of individual animal stalls and having feeding means thereon, means to move the carriage from stall to stall and including an electric motor, a main circuit for the motor, first and second switches interposed in parallel in said circuit, the first switch tending to open, a normally energized electric device to hold the first switch closed, the second switch being normally open, a normally inactive electric timer connected to the second switch to close the same upon energization of said device, an auxiliary circuit for said device, another auxiliary circuit for the timer, a two-way switch interposed between the auxiliary circuits and normally closing the first auxiliary circuit, and means controlled by the arrival of the carriage at any stall to move the two-way switch so as to open the first auxiliary circuit and close the other auxiliary circuit.

5. A structure, as in claim 3, in which the tabs are independently removably mounted on the member.

6. In an animal feeding device which includes a carriage mounted for movement past a row of individual animal stalls and having feeding means thereon, means to move the carriage including an electric motor mounted thereon, a circuit for the motor, a manually operable switch in the circuit, another normally closed switch in the circuit mounted on the carriage, a stationary element fixed separate from the carriage adjacent each stall and arranged to open the last named switch upon the arrival of the carriage to a feeding position at such stall, and a timing device arranged in connection with said last named switch to hold the same thus opened for a predetermined length of time only.

7. A structure, as in claim 6, in which each such element is removable so that its switch opening action is then voided.

References Cited in the file of this patent

UNITED STATES PATENTS

| | | |
|---|---|---|
| 2,263,069 | Coyner | Nov. 18, 1941 |
| 2,280,410 | Keltner | Apr. 21, 1942 |
| 2,685,863 | Martin | Aug. 10, 1954 |
| 3,037,481 | Kloss | June 5, 1962 |

FOREIGN PATENTS

| | | |
|---|---|---|
| 16,782 | Sweden | Jan. 19, 1903 |
| 439,131 | Great Britain | Nov. 29, 1935 |
| 272,511 | Switzerland | Mar. 16, 1951 |